United States Patent Office 2,919,224
Patented Dec. 29, 1959

2,919,224

AROMATIC TOXIC NITRILES

Samuel Allen Heininger and Gail H. Birum, Dayton, Ohio, assignors to Monsanto Chemical Company, St. Louis, Mo., a corporation of Delaware No Drawing. Application February 21, 1957
Serial No. 641,475

20 Claims. (Cl. 167—30)

This invention relates to toxic aromatic nitriles and more particularly provides methods for the control of microorganisms and certain novel compositions comprising sulfur-containing nitriles which are highly toxic to microorganisms.

In one aspect, this invention concerns the reacttion of aromatic sulfenyl halides with olefinic nitriles to produce novel compositions of matter.

The $\alpha,\beta$-olefinically unsaturated nitriles are known to be resistant to reaction with sulfenyl halides. Thus, e.g., as reported by Kharasch and Buess, J. Am. Chem. Soc. (1949), vol. 71, page 2726, first column, whereas adducts of dinitrobenzenesulfenyl chloride with a number of different olefinic compounds have been prepared successfully by these workers, they found it impossible to effect reaction of the sulfenyl halide with acrylonitrile. Turner and Connor, J. Am. Chem. Soc. (1947) 69, 1009, similarly report failure to produce addition of 4-chloro-2-nitrobenzenesulfenyl chloride and 4-nitrobenzenesulfenyl chloride to compounds in which the double bond was conjugated with a carbonyl, carbethoxyl or cyano group. Our own experiments have confirmed this finding that nitrobenzenesulfenyl halides do not react with acrylonitrile under conditions normally leading to adduct formation when the sulfenyl halide is contacted with other olefins. Furthermore, repeated attempts to react acrylonitrile with perchloromethyl mercaptan, a sulfenyl halide of the formula $Cl_3CSCl$, which is known to be highly reactive and to undergo ready reaction with a variety of unsaturated organic compounds, have proved fruitless.

It is accordingly unexpected that, as now reported, an aromatic sulfenyl halide is found to react readily with acrylonitrile.

The products of this reaction are complex mixtures. An attempted structure proof has indicated that the reaction product contains a mixture of a 3-halo-2-arylthiopropionitrile and the isomeric 2-halo-3-arylthiopropionitrile, as well as an unsaturated arylthio-substituted acrylonitrile. However, there are certain contradictory and unexplained features in the behavior of the reaction product which are not fully understood as yet. In view of the uncertainty of the composition of the present reaction mixture, therefore, while we conceive the composition to be as described above, we prefer not to be bound by such hypothesis, but to claim the reaction product per se, whatever the actual composition.

This invention also contemplates the reaction of aromatic sulfenyl halides with other $\alpha,\beta$-olefinic nitriles. We have found that aromatic sulfenyl halides add to 3-substituted acrylonitriles more sluggishly than to acrylonitrile itself, in agreement with the known fact that vinylidene compounds containing a terminal $CH_2=$ group are more reactive than those in which the olefinic double bond is attached to substituents replacing hydrogen on either side of the double bond. However, experiments with compounds such as cinnamonitrile, wherein the beta carbon atom of acrylonitrile is substituted by a hydrocarbon radical, indicate that the reaction proceeds in essentially the same direction as with acrylonitrile.

On the other hand, when the alpha carbon atom of an $\alpha,\beta$-olefinic nitrile contains a substituent replacing hydrogen, e.g., when there is employed an acrylonitrile homolog such as methacrylonitrile, the reaction with an aromatic sulfenyl halide appears to proceed quite differently than with $\alpha,\beta$-olefinic nitriles wherein the carbon atom adjacent to the nitrile radical is substituted only by a hydrogen atom. Unexpectedly, the product of reaction of benzenesulfenyl chloride with methacrylonitrile appears to be a single compound, so far as can be determined, although the possibility of this being a mixture of position isomers is not excluded. Unsaturated compounds, characteristic of the complex reaction product obtained from acrylonitrile, have not been found in the reaction product of methacrylonitrile. Our data indicate that the reaction product of an aromatic sulfenyl halide with an alpha hydrocarbyl-substituted nitrile is a simple adduct which may be represented by the following formula

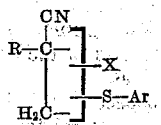

where R represents a hydrocarbon radical, X represents a halogen atom, and Ar represents an aromatic radical. The bracketed formula above is used to indicate that the position of attachment of the halogen and of the arylthio radicals is uncertain; e.g., by the reaction of methacrylonitrile with benzenesulfenyl chloride, there is obtained 2 - chloro - 3 - (phenylthio) - 2 - methylpropionitrile and/or 3-chloro-2-(phenylthio)-2-methylpropionitrile.

As pointed out above, the $\alpha$-substituted olefinic nitriles differ from the olefinic nitriles containing hydrogen as the sole substituent on the alpha carbon atom in that the product of reaction with aromatic sulfenyl halides is, in the one case, a complex mixture of products, and in the other case apparently a single compound, or mixture of position isomers, of uniform elemental analytical composition. We have found that there is a further difference between the products obtained. The products of reaction of $\alpha$-substituted acrylonitriles with aromatic sulfenyl halides possess biological toxicant activity; at a concentration of 0.1% in a medium ordinarily supporting bacterial and fungal growth, they inhibit the growth of microorganisms. The complex reaction product obtained by reaction of acrylonitrile with aromatic sulfenyl halides, however, is an extraordinarily active micro-biological toxicant, being far more potent than the products of reaction of $\alpha$-substituted acrylonitriles with corresponding aromatic sulfenyl halides, or than a number of other related compounds. Whereas reaction products of aromatic sulfenyl halides with $\alpha$-substituted olefinic nitriles and also various other substituted propionitriles are effective in suppressing bacterial and fungal growth at concentrations on the order of 0.1%, the present reaction products from acrylonitrile and benzenesulfenyl halides are unique in that they are able to control microbiological organism growth at concentrations on the order of one thousandth of this concentration, i.e., down to 1 part per million. These especially effective reaction products are active against both gram negative and gram positive bacteria, which is an unusual property, as well as against sulfate-reducing bacteria, which are ordinarily resistant to most of the known bactericides. Furthermore, the microbiological toxicant activity remains effective in the presence of soap, which in many cases acts to reduce or eliminate the activity of bactericidal agents.

As indicated above, the reaction product of an aromatic sulfenyl halide with an α-hydrocarbyl acrylonitrile, such as methacrylonitrile, appears to be a 3-halo-2-(arylthio)-2-methylpropionitrile and/or 2-halo-3-(arylthio)-2-methylpropionitrile. The general reaction whereby such products are formed is believed to be represented by the following equation:

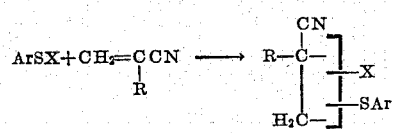

where Ar represents an aromatic hydrocarbon radical of from 1 to 2 benzene rings attached to the sulfur atom by a nuclear carbon atom, and SX represents a sulfenyl halide radical; R represents a hydrocarbon radical; and the bracketed structure of the reaction product indicates that X and the ArS radicals are attached alternatively to the alpha or the beta carbon atoms.

So far as we are aware, arylthio-substituted haloalkanenitriles of the above formula have not been known hitherto.

By the present invention of the reaction of an α-hydrocarbyl acrylonitrile with an aromatic sulfenyl halide, there are provided the compounds of the above formula where R is a hydrocarbon radical.

It forms a further aspect of this invention to provide compounds of the above general formula where R represents hydrogen. Such compounds are believed to be present in the reaction product of acrylonitrile with aromatic sulfenyl halides, but there are contradictory features in the attempted structure proof which we have carried out for such reaction products, which render the composition of the reaction mixture unproved. However, alternative methods are available, whereby the present (arylthio)halopropionitriles may be obtained. For the synthesis of 2-halo-3-(arylthio)propionitriles, two different syntheses are available: addition of an aromatic thiol to an α-haloacrylonitrile; and reaction of an alkali salt of an aromatic thiol with an α,β-dihalopropionitrile, displacement of the halogen atom occurring at the beta position. The 3-halo-2-(arylthio)propionitriles are available by pyrolytic dehydrohalogenation of the 2-halo-3-(arylthio)propionitrile, which is accompanied by rearrangement to give 2-(arylthio) acrylonitriles. Addition of a hydrogen halide to the 2-(arylthio)acrylonitrile gives a 3-halo-2-(arylthio)propionitrile. The presently provided arylthio-substituted haloalkanenitriles are of the formulas

and

which may be together represented by the general formula

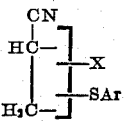

where in each of the above formulae X represents a halogen atom and Ar represents an aromatic hydrocarbon radical attached to the sulfur atom by a nuclear carbon atom, the bracketed structure of the general formula indicating that the compound represented thereby is either a 2-halo-3-(arylthio)- or a 3-halo-2-(arylthio)propionitrile.

Thus, in one aspect this invention pertains to the reaction of an aromatic sulfenyl halide with an α,β-olefinic nitrile; this reaction being employed for the conversion of α-hydrocarbyl-substituted olefinic nitriles to certain novel chemical compounds and being employed with an α,β-olefinic nitrile free of α-hydrocarbon substituents to obtain complex reaction products of unusual properties.

In another aspect, this invention relates to compounds of the general formula

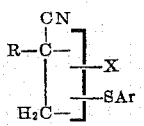

where X represents a halogen atom and Ar represents an aromatic hydrocarbon radical attached to the sulfur atom by a nuclear carbon atom, and R represents hydrogen or a hydrocarbon radical, these compounds being of utility as chemical intermediates and as microbiological toxicants, and being obtained by reaction of an α-hydrocarbyl-substituted olefinic nitrile with an aromatic sulfenyl halide, and by other reactions.

In another aspect, the invention concerns the complex reaction products of acrylonitrile and β-substituted acrylonitriles with aromatic sulfenyl halides, these products having utility as biological toxicants and for other purposes.

An additional object of the present invention is the utilization of the reaction product of acrylonitrile with aromatic sulfenyl halides, and particularly monocyclic aromatic sulfenyl chlorides containing from 0 to 2 methyl substituents on the benzene ring, as bactericides and as fungicides.

This invention additionally sets forth the concept of utilizing an α-halo-β-(phenylthio)propionitrile or β-halo-α-(phenylthio)propionitrile, and particularly those wherein the phenyl ring is substituted by from 0 to 2 methyl radicals, as bactericides and fungicides.

The olefinic nitriles presently useful for reaction with sulfenyl halides in accordance with this invention are of the general formula

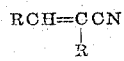

where each R represents hydrogen or a hydrocarbon radical free of aliphatic unsaturation and containing from 1 to 6 carbon atoms, provided that at least one R represents hydrogen.

Acrylonitrile is the preferred olefinic nitrile employed in the practice of this invention to produce complex reaction products. The β-hydrocarbyl-substituted acrylonitriles react similarly to acrylonitrile, giving complex reaction products, but are less reactive than acrylonitrile, in conformity with the general rate of reactivity of a terminal olefinic bond as compared to an olefinic bond with an interchain of carbon atoms. Exemplary of β-substituted acrylonitriles which may be employed in the practice of the invention are, e.g., crotononitrile, 2-hexenenitrile, cinnamonitrile, 3-cyclopentylacrylonitrile, 3-cyclohexylacrylonitrile, etc. It will be appreciated that, whereas acrylonitrile is preferred in the present invention for the production of the presently afforded extraordinarily active microbiological toxicant compositions, other β-substituted α,β-olefinic nitriles as listed above having the formula of the presently preferred olefinic nitriles may be used in the practice of the process of the invention advantageously for such purposes as the production of reaction mixtures having valuable properties per se, e.g., as dielectrics, as functional fluids, and as a source of chemical intermediates, e.g., of olefinic polymerizable monomers, as well as having biological toxicant properties.

As mentioned above, an α-hydrocarbyl-substituted nitrile may be employed in the process of the invention to produce what we conceive to be 3-halo-2-(arylthio)-2-hydrocarbylpropionitriles and/or 2-halo-3-(arylthio)-2-hydrocarbylpropionitriles as represented by the following general formula

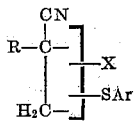

where R represents a hydrocarbon radical free of aliphatic unsaturation and containing from 1 to 6 carbon atoms, X represents a halogen atom, and Ar represents an aromatic radical. For the production of compounds of the above formula there are employed terminally unsaturated α-substituted α,β-olefinic nitriles wherein the alpha substituent is a hydrocarbon radical containing 1 to 6 carbon atoms and free of aliphatic unsaturation, e.g., 2-methylenebutyronitrile, 2-methylenecapronitrile, 2-methyleneheptanenitrile, 4,4-dimethyl-2-methylenevaleronitrile, 2-phenylacrylonitrile, 2-cyclohexylacrylonitrile, etc.

The present useful aromatic sulfenyl halides may be characterized generally as sulfenyl halides wherein the sulfenyl halide radical is attached directly to a nuclear carbon atom of an aromatic hydrocarbon radical. As used herein, the term "aromatic" denotes a compound or radical containing a benzene nucleus which may be attached to or fused with another benzene ring and which may be substituted by alkyl radicals. In the process of the invention it is preferred that the aromatic radicals of such aromatic sulfenyl halides should be hydrocarbon radicals containing from 6 to 12 carbon atoms and free of aliphatic, i.e., carbon-to-carbon, olefinic or acetylenic, unsaturation.

Chlorine is the preferred substituent in the sulfenyl halide radical of the presently useful aromatic sulfenyl halides, but it is also possible to employ bromine, or less preferably, iodine, in place of chlorine.

For the practice of the process of the invention to obtain highly effective microbiological toxicant compositions, it is preferred to employ monocyclic sulfenyl chlorides, wherein the benzene radical is substituted by from 0 to 2 methyl radicals, e.g., benzenesulfenyl chloride, p-toluenesulfenyl chloride, m-toluenesulfenyl chloride, o-toluenesulfenyl chloride, 2,4-xylenesulfenyl chloride, 3,4-xylenesulfenyl chloride, 2,3-xylenesulfenyl chloride, 3,5-xylenesulfenyl chloride, etc. Other of the presently useful class of monocyclic aromatic sulfenyl halides include, e.g., methyl-substituted benzene sulfenyl halides such as benzenesulfenyl bromide, benzenesulfenyl iodide, p-toluenesulfenyl bromide, m-toluenesulfenyl iodide, 2,4-xylenesulfenyl bromide, 3,4-xylenesulfenyl bromide, 2,4,5-trimethylbenzenesulfenyl chloride, 2,4,5-trimethylbenzenesulfenyl bromide, 2,3,5,6 - tetramethylbenzenesulfenyl chloride, pentamethylbenzenesulfenyl chloride, 4-ethylbenzenesulfenyl chloride, 2,4-diethylbenzenesulfenyl chloride, 4-isopropylbenzenesulfenyl chloride, 4-n-butylbenzenesulfenyl chloride, 4-t-butylbenzenesulfenyl chloride, 2-methyl-4-isopropylbenzenesulfenyl chloride, 4-n-hexylbenzenesulfenyl chloride, etc. There may also be used in the practice of the process of the invention such polycyclic aromatic sulfenyl chlorides as, e.g., 1-naphthalenesulfenyl chloride, 2-naphthalenesulfenyl chloride, 2-naphthalenesulfenyl bromide, 4-biphenylsulfenyl chloride, 3-biphenylsulfenyl chloride, 4 - cyclohexylbenzenesulfenyl chloride, 5-methylnaphthalenesulfenyl chloride, 5,8-dimethylnaphthalenesulfenyl chloride, etc. It will be appreciated that whereas the monocyclic benzenesulfenyl chlorides substituted by from 0 to 2 methyl radicals are employed in the practice of the invention preferably to obtain highly effective microbiological toxicant compositions, other presently useful aromatic sulfenyl halides as listed above can be employed in the practice of the invention, either with acrylonitrile or with α- or β-substituted acrylonitriles to produce products having utility for various purposes, e.g., as functional fluids, as plasticizers, etc., as well as possessing toxicant activity. In place of individual aromatic sulfenyl halides, there may alternatively be used mixed sulfenyl halides, e.g., mixed toluene- or xylenesulfenyl chlorides.

We consider that the reaction of an aromatic sulfenyl halide with an α-hydrocarbyl-substituted acrylonitrile may be represented by the following equation,

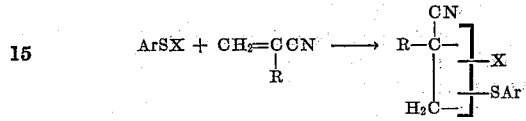

where R, X, and Ar are as defined hereinabove, the products being adducts which may be characterized as 3(2) - halo - 2(3) - (arylthio) - 2 - hydrocarbylpropionitriles, whereby this nomenclature is meant a 3-halo-2-(arylthio)-2-hydrocarbylpropionitrile and/or 2-halo-3-(arylthio)-2-hydrocarbylpropionitrile, and claim these compounds as new. These novel compounds provided by the process of this invention by the reaction of methacrylonitrile with aromatic sulfenyl halides include, e.g., 3(2) - chloro - 2(3) - (phenylthio) - 2 - methylpropionitrile, 3(2)-chloro-2(3)-(4-methylphenylthio)-2-methylpropionitrile, 3(2)-bromo-2(3)-(4-methylphenylthio)-2-methylpropionitrile, 3(2) - chloro - 2(3) - (2,4-dimethylphenylthio) - 2 - methylpropionitrile, 3(2)-chloro-2(3)-(3,4-dimethylphenylthio)-2-methylpropionitrile, 3(2)-bromo - 2(3) - (3,5 - dimethylphenylthio) - 2 - methylpropionitrile, 3(2)-chloro-2(3)-(2,4,5-trimethylphenylthio)-2-methylpropionitrile, 3(2)-chloro-2(3)-(4-isopropylphenylthio)-2-methylpropionitrile, 3(2)-chloro-2(3)-(4-t-butylphenylthio)-2-methylpropionitrile, 3(2)-chloro-2(3) - (2 - methyl - 4 - ethylphenylthio) - 2 - methylpropionitrile, 3(2) - chloro - 2(3) - chloro-2(3)-(4-biphenylthio) - 2-methylpropionitrile, 3(2)-chloro-2(3)-(2-naphthylthio)-2-methylpropionitrile, etc.

When there is employed a higher homolog of methacrylonitrile, there are obtained in accordance with this invention compounds such as 3(2)-chloro-2(3)-(phenylthio) - 2 - ethylpropionitrile, 3(2)-bromo-2(3)-(phenylthio)-2-ethylpropionitrile, 3(2)-chloro-2(3)-(4-methylphenylthio)-2-ethylpropionitrile, 3(2)-chloro-2(3)-(2,4-dimethylphenylthio)-2-ethylpropionitrile, 3(2)-chloro-2(3) - (4 - isopropylphenylthio) - 2 - isopropylpropionitrile, 3(2)-chloro-2(3)-(4-biphenylthio)-2-isopropylpropionitrile, 3(2)-chloro-2(3)-(phenylthio)-2-neopentylpropionitrile, 3(2)-chloro-2(3)-(4-methylphenylthio)-2-hexylpropionitrile, etc. Alternatively to 2-alkyl-substituted acrylonitriles, there may be employed in the present reaction 2-aryl- or 2-cycloalkyl-substituted acrylonitriles, giving such products as 3(2)-chloro-2(3)-(phenylthio)-2-phenylpropionitrile, 3(2)-chloro-2(3)-(4-methylphenylthio)-2-phenylpropionitrile, 3(2)-chloro-2(3)-(4-methylphenylthio)-2-(4-methylcyclopentyl)propionitrile, etc.

It will be appreciated that the present adducts and also the 3-halo-2-(arylthio)- and 2-halo-3-(arylthio)propionitriles prepared as described hereinbelow contain an asymmetric carbon atom and each position isomer is obtained as a racemic mixture of optical isomers which may be resolved into individual d- and l-isomers. The individual optical isomers are intended to be included by the nomenclature used herein.

It has been pointed out above that the reaction product of acrylonitrile or of β-substituted acrylonitriles with the presently useful aromatic sulfenyl halides is a reaction product containing unsaturated thio-substituted nitriles. These unsaturated nitriles may amount to about one-third by weight of the aforesaid reaction product. Theoretical considerations and indications obtained for the product dictate that this unsaturated material obtained from acrylonitrile should be primarily or entirely an α-(arylthio)acrylonitrile. These compounds are of interest, for example, as olefinic monomers which are useful for the synthesis of polymers of utility for forming films, fibers, etc. Thus, the present reaction also affords a means of obtaining such arylthio-acrylonitriles as (phenylthio)-acrylonitrile, (4-methylphenylthio) - acrylonitrile, (4-ethylphenylthio)acrylonitrile, (2,4-dimethylpenythio)acrylonitrile, (2-methyl-4-isopentylphenylthio) - acrylonitrile, etc.

The new products provided by this invention by the reaction of sulfenyl halides with nitriles vary in properties from liquids to solid materials and from stable to volatile or readily polymerizable sensitive compounds, depending on the starting materials. They may be considered as falling into two classes:

(1) The complex reaction products of acrylonitrile and β-substituted acrylonitriles with aromatic sulfenyl halides; and (2) The compounds obtained by reaction of methacrylonitrile and similar α-hydrocarbyl-substituted acrylonitriles with aromatic sulfenyl halides as defined above.

The first of these products are extremely valuable microbiological toxicants when there is employed for their synthesis acrylonitrile and a benzenesulfenyl chloride wherein from 0 to 2 methyl radicals are present on the benzene ring. Useful compounds are also obtained by the reaction of acrylonitrile or β-hydrocarbyl-substituted acrylonitriles with these or other of the presently useful aromatic sulfenyl halides, the complex reaction mixtures obtained thereby being suitable as sources of olefinic monomers, as plasticizers and functional fluids, as biological toxicants, e.g., as herbicides, plant fungicides, bactericides, etc., and for other purposes.

When the nitrile employed in the process of the invention is an α-hydrocarbyl-substituted acrylonitrile, then the present process gives compounds which can be used per se as microbiological toxicants for the control of microorganisms such as *Micrococcus pyogenes* var. *aureus* or may be useful as intermediates for chemical synthesis, e.g., the reactive halogen atom in such compounds can be replaced by other functional groups such as phosphonyl radicals to produce parasiticidal compounds.

The process of the invention whereby sulfenyl halide reaction products and adducts are obtained involves contacting approximately equimolecular amounts of an aromatic sulfenyl halide as defined hereinabove with acrylonitrile or an α- or β-hydrocarbyl-substituted acrylonitrile of the general formula of the presently useful olefinic nitriles. If desired, an excess of the more readily available component may be present in the reaction mixture to serve, e.g., as a reaction diluent. The reaction appears to consume approximately equimolecular amounts of each reactant, and when an excess of either component is used, it generally can be recovered unchanged at the close of the reaction. The rapidity of reaction varies greatly, depending on the reactants chosen, some reactions being exothermic and requiring solvents and/or diluents to moderate their violence, while others do not reach completion until after a period of refluxing at elevated temperatures. Suitable inert solvents and diluents which may be employed in the reaction mixture, if desired, include hydrocarbons such as benzene, halogenated solvents such as carbon tetrachloride, and oxygenated solvents free of active hydrogen such as ether, etc. A particularly preferred class of solvents are anhydrous organic carboxylic acids, and especially glacial acetic acid, since this solvent also has the advantage of acting as a catalyst for the reaction. Mixtures of glacial acetic acid and an inert solvent such as ethylene dichloride may also be used as a reaction medium if desired.

The use of catalysts is not necessary but may be advantageous under some circumstances. Exemplary of acid catalysts which may be used in the present reaction, besides glacial acetic acid as mentioned above, are, e.g., Friedel-Crafts catalysts such as aluminum chloride, boron trifluoride complexes, etc. Pressure variation may also be utilized to facilitate the conduct of the reaction, e.g., when the reaction is carried out in a pressure resistant vessel under autogenous pressure and elevated temperatures are employed.

Since unsaturated nitriles and especially acrylonitrile are susceptible to thermal polymerization, the reaction is preferably conducted in the presence of polymerization inhibitors. Examples of suitable polymerization inhibitors are, e.g., hydroquinone, the monomethyl ether of hydroquinone, methylene blue, copper carbonate, selenium dioxide, etc.

The time required to accomplish the reaction and form the presently afforded reaction products depends on functional factors such as the reactivity of the α,β-olefinic nitrile and the sulfenyl halide, the temperature of reaction, the presence or absence of catalysts, etc. Reaction rates and times of reaction may vary considerably, depending on details of apparatus and other operational conditions. By modification of the apparatus, continuous procedures may be substituted for the batch-type operation described below.

An indication of the progress of the reaction is a color change in the reaction mixture; generally, sulfenyl halides are a deep red color and the reaction mixture lightens as the sulfenyl halide is consumed. On completion of the reaction, conventional methods such as filtration, decantation, and evaporation may be employed to separate the products. In the case of reaction products of α-hydrocarbyl-substituted acrylonitriles such as methacrylonitrile, procedures such as distillation or extraction may serve to isolate the individual products. When the complex reaction products from acrylonitrile or 3-substituted acrylonitriles with aromatic sulfenyl halides are being worked up, it is to be noted that elevated temperatures employed during distillation appear to promote dehydrohalogenation of the products. Thus, if it is desired to obtain olefinic monomers from the reaction products of acrylonitrile with halogenated aromatic sulfenyl halides, distillation or heating, preferably in the presence of hydrogen halide acceptors, facilitates the production of such unsaturated products. On the other hand, if it is desired to avoid, insofar as possible, any dehydrohalogenation of the reaction product, the reaction products may be prepared by contacting essentially equimolecular amounts of nitrile and sulfenyl halide, or the excess unreacted component of this reaction mixture may be distilled off, the reaction product being obtained as residue.

The details of modes of procedure in accordance with this invention are illustrated by the following non-limiting examples:

*Example 1*

Benzenesulfenyl chloride was prepared by gradually adding a solution of 110 g. (1.0 mole) of benzenethiol in 300 ml. of carbon tetrachloride to a solution of 168 g. (2.33 moles) of chlorine in 800 ml. of carbon tetrachloride held at 5 to 10° C. Unreacted chlorine was removed under vacuum from the red-orange reaction mixture, which thereupon turned clear red.

Acrylonitrile was run into the clear red solution of the benzenesulfenyl chloride with cooling until 106 g. (2 moles) of the nitrile had been added. The solution was then gradually warmed up to reflux for 2½ hours; at the end of this time, 200 ml. of glacial acetic acid was added and refluxing was continued for another hour, during which some lightening of the color of the solution occurred. After standing overnight, the reaction mixture had become light yellow-orange. On distillation of the reaction mixture, there were obtained 129 g. (75.5% yield based on benzenethiol) of the reaction product of acrylonitrile with benzenesulfenyl chloride as a liquid, b. 132–5° C./0.8–1.0 mm. $n_D^{25}$ 1.5855, analyzing as follows:

|  | Found | Calcd. for $C_9H_8ClNS$ |
|---|---|---|
| Percent: |  |  |
| C | 55.53 | 54.7 |
| H | 4.18 | 4.08 |
| S | 16.22 | 16.2 |

*Example 2* p-Toluenesulfenyl chloride was prepared by adding 100 g. (0.8 mole) of p-toluenethiol in 350 ml. of carbon tetrachloride to a cool solution of 60 g. of chlorine in 800 ml. of carbon tetrachloride. The resulting red reaction mixture was warmed to room temperature and distilled to remove carbon tetrachloride, whereupon there were collected 51 g. (0.322 mole) of p-toluenesulfenyl chloride as a fraction boiling up to 76° C./0.7 mm.

The p-toluenesulfenyl chloride prepared as described above was added with stirring to a 300 ml. flask containing 26.5 g. (0.5 mole) of acrylonitrile in 100 ml. of glacial acetic acid. The reaction was exothermic, the temperature rising within 15 minutes to 62° C., during which time the color of the reaction mixture changed from the original dark red to a clear bright yellow. Stirring was continued for 2 hours and then the reaction mixture was allowed to stand overnight. On distillation there were obtained 54.5 g. of the reaction product of acrylonitrile with p-toluenesulfenyl chloride as a slightly viscous yellow liquid, b. 135–138° C./0.3 mm., $n_D^{25}$ 1.5691, analyzing as follows:

|  | Found | Calcd. for $C_{10}H_{10}ClNS$ |
|---|---|---|
| Percent: |  |  |
| C | 56.56 | 56.8 |
| H | 5.08 | 4.77 |
| Cl | 16.46 | 16.8 |
| N | 6.44 | 6.62 |
| S | 15.08 | 15.15 |

*Example 3*

On addition of 31.7 g. (0.2 mole) of o-toluenesulfenyl chloride to 15.9 g. of acrylonitrile in 100 ml. of glacial acetic acid, there was no immediate exothermic reaction, but on standing, a gradual temperature rise occurred in the reaction mixture and the color of the reaction mixture lightened from red to orange within one hour. During a second hour, the temperature of the reaction mixture subsided, while the color faded to yellow. After removal of solvent, there was collected by distillation 28.8 g. of the reaction product of acrylonitrile with o-toluenesulfenyl chloride as a yellow liquid, b. 127–128°/0.25 mm., $n_D^{25}$ 1.5747, containing unsaturated compounds in accordance with infrared analysis. The elementary analysis of the reaction product was as follows: 57.25% carbon, 5.01% hydrogen, 6.42% nitrogen, 16.65% chlorine, 14.81% sulfur.

*Example 4*

This is an example of the reaction of a mixture of toluenesulfenyl chloride isomers with acrylonitrile.

A sample of mixed o-, m-, and p-thiocresols of very high purity of the order 96+% obtained from coal tar acids was used as a basic raw material. Two hundred and thirty-five (235) grams of the mixed thiocresols (1.9 moles on pure thiocresol) was placed in a 1 liter flask and 350 ml. of $CCl_4$ was added with stirring at 10–20° C. Chlorine gas was bubbled into this reaction mixture over a 1½ hour period. The reaction was exothermic. The reaction mixture was stirred for 45 minutes longer, while a very slow stream of chlorine was passed into the mixture to give a dark red color of the material in the flask. The excess chlorine and carbon tetrachloride were distilled from the product under vacuum. The product was then distilled under vacuum and had a boiling point at 4 mm. of 84° C. and 77–79° C. at 1.5 mm. A total of 226 g. were obtained of red sulfenyl chloride, $n_D^{25}$ 1.5982. The yield based on 1.9 moles of thiocresols charged was 75.4%. A pot residue of 54 g. of a viscous red liquid remained.

Fifty-three (53) grams (1.0 mole) of acrylonitrile was placed in a 500 ml. flask and 250 ml. of glacial acetic acid was added. With stirring, 78.3 g. (0.494 mole) of the distillate sulfenyl chloride prepared in this Example were slowly added to the flask. A slow exothermic reaction occurred and the temperature rose in 1½ hours to 45° C. with the color changing from red to light yellow. The flask and contents therein were warmed for ½ hour longer at 55° C. and then the excess solvent and acrylonitrile was distilled from the product. After a virtually negligible forerun, 85.3 g. of a light yellow product was collected by distillation under vacuum. This product had a refractive index, $n_D^{25}$ 1.5737. The product did not discolor on standing overnight and had a boiling point of 131–134° C. at 0.2 mm. The pot residue weighed 10 g. and was a viscous higher boiling reddish liquid. The yield of distillate product was 82% and had the following elementary analysis:

|  | Found | Calcd. for $C_{10}H_{10}ClNS$ |
|---|---|---|
| Percent: |  |  |
| C | 57.36 | 56.8 |
| H | 4.82 | 4.77 |
| Cl | 16.13 | 16.8 |
| N | 6.28 | 6.62 |
| S | 15.62 | 15.15 |

Similarly, by the reaction of acrylonitrile with xylenesulfenyl chloride or with naphthalenesulfenyl bromide, there are obtained reaction products comprising compounds containing sulfur atoms and nitrile radicals.

*Example 5*

This is an example of an adduct of acrylonitrile and mixed isomers of o-, m-, and p-xylenesulfenyl chloride.

A mixture of o-, m-, and p-thioxylenols in amount of 233 g. was placed in a 1 liter flask. This material was of very high purity of the order of 98+%. To this flask was added 400 ml. of $CCl_4$ and the contents were cooled to 5° C. A slow stream of chlorine was bubbled through the mixture in the flask over a period of 2½ hours at 0–10° C. to give a deep red product and a total increase in weight of 56 g. in the flask content. The $CCl_4$ was removed by distillation under vacuum with some foaming occurring. Then the sulfenyl chloride was distilled under vacuum, collecting 259 g. of red sulfenyl chloride having a boiling point of 85–88° C. at 0.6 mm. and 88–92° C. at 1.1 mm. and a refractive index of $n_D^{25}$ 1.5895. There were 34 g. of viscous brown fluid residue remaining in the flask. This residue was soluble in acetone and evolved a slight amount of HCl. Yield of the distillate was 89%.

A sample of 53 g. (1.0 mole) of acrylonitrile was placed in a 500 ml. flask with 200 ml. of glacial acetic acid. To this flask was added 86.3 g. (0.5 mole) of the mixed sulfenyl chlorides prepared in this example. There was an exothermic reaction lasting about ½ hour, the color changed from red to a clear light yellow, and the temperature rose to about 50° C. before subsiding. The reaction mixture was stirred for ½ hour longer at this temperature, after which time the acetic acid was distilled off under vacuum and the product also distilled. After a small amount of forerun (2.6 g.), 83.0 g. was collected of a light yellow liquid having a boiling point 144–147° C. at 1.2 mm. and a refractive index of $n_D^{25}$ 1.5668. The yield of the distillate was 73.5%, leaving a pot residue of higher boiling materials weighing 17 g. The composition of the product is indicated by the following elementary analysis:

|  | Found | Calcd. for $C_{11}H_{12}ClNS$ |
|---|---|---|
| Percent: | | |
| C | 58.05 | 58.6 |
| H | 5.47 | 5.37 |
| Cl | 14.31 | 15.75 |
| N | 6.12 | 6.21 |
| S | 14.19 | 14.29 |

*Example 6*

This example describes the reaction of an aromatic sulfenyl halide with a β-hydrocarbyl-substituted acrylonitrile.

To 25.8 g. (0.2 mole) of cinnamonitrile in 100 ml. of glacial acetic acid were added 31.2 g. (0.2 mole) of p-toluenesulfenyl chloride. The solution was held at 60° overnight and then distilled. The reaction product of cinnamonitrile with p-toluenesulfenyl chloride was collected as the fraction boiling at 155–160°/0.4 mm., having the following analytical elemental composition: 71.53% carbon, 5.54% hydrogen, 1.33% chlorine, 2.80% nitrogen, 19.01% sulfur; nitrile absorption was observed in the infrared spectrum of this product.

*Example 7*

This example describes the addition of an aromatic sulfenyl halide to an α-hydrocarbyl-substituted acrylonitrile.

When to 13.4 g. (0.2 mole) of methacrylonitrile in 100 ml. of glacial acetic acid was added 31.7 g. (0.2 mole) of p-toluenesulfenyl chloride and the reaction mixture was warmed slowly to 70° C. over a 30-minute period, the color of the reaction mixture lightened gradually from deep red to a clear bright yellow. After removal of the acetic acid, there were collected 30.5 g. (67.7% yield) of 3(2)-chloro-2(3)-(4-methylphenylthio)-2-methylpropionitrile as a bright yellow liquid, b. 122–124° C./0.2 mm., $n_D^{25}$ 1.5581. The infrared spectrum of this product showed a medium intensity nitrile absorption which was a single band and gave no evidence of the presence of conjugated unsaturated product. The composition of the product corresponded to that of an adduct of the p-toluenesulfenyl chloride with the methacrylonitrile as indicated by the following elementary analysis:

|  | Found | Calcd. for $C_{11}H_{12}ClNS$ |
|---|---|---|
| Percent: | | |
| C | 58.82 | 58.6 |
| H | 5.69 | 5.36 |
| Cl | 16.06 | 15.75 |
| N | 5.94 | 6.22 |
| S | 14.45 | 14.2 |

The product prepared by the procedure of this example, by the reaction of methacrylonitrile with p-toluenesulfenyl chloride, i.e., 3(2)-chloro-2(3)-(4-methylphenylthio)-2-methylpropionitrile, is identified as 2-chloro-3-(4 - methylphenylthio) - 2 - methylpropionitrile and/or 3-chloro-2-(4-methylphenylthio) - 2 - methylpropionitrile.

In addition to the reaction products of aromatic sulfenyl halides with olefinic nitriles, this invention provides as new compounds 3-halo-2-arylthiopropionitriles and 2-halo-3-arylthiopropionitriles of the general formula

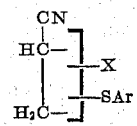

where X represents a halogen atom and Ar represents an aromatic hydrocarbon radical, free of aliphatic unsaturation, attached to the sulfur atom by a nuclear carbon atom, and containing up to 12 carbon atoms. These compounds are adapted for the control of bacteria and fungi, especially when X represents chlorine and Ar represents a phenyl radical substituted by from 0 to 2 methyl radicals. The compounds corresponding to the general formula above are also of utility as plasticizers and functional fluids, as well as being useful as chemical intermediates, e.g., for the synthesis of phosphorus compounds active as biological toxicants, oil additives, etc.

For the preparation of 2-halo-3-(arylthio)propionitriles of the above formula, there may be employed the reaction of an aromatic thiol with an α-haloacrylonitrile. α-Chloroacrylonitrile is the preferred α-haloacrylonitrile; α-bromacrylonitrile is substantially equally reactive with the present thiols, while α-iodoacrylonitrile and α-fluoroacrylonitrile are less preferred but usable alternatives. The presently useful aromatic thiols include mono- and bicyclic aromatic thiols containing up to 12 carbon atoms and wherein the aromatic radical is a hydrocarbon radical free of aliphatic unsaturation and linked to the sulfenyl halide radical by a nuclear carbon atom. Exemplary of presently useful monocyclic aromatic thiols are thiophenol, 4-methylthiophenol, toluenethiol, i.e., mixed isomeric methylthiophenols, 3,4-dimethylthiophenol, 2,4-dimethylthiophenol, xylenethiol, i.e., mixed dimethylthiophenols, 2,4,5-trimethylthiophenol, 4-ethylthiophenol, 4-isopropylthiophenol, 3 - methyl-4-isopropylthiophenol, 4-neopentylthiophenol, 2,4 - diethylthiophenol, etc. Other aromatic thiols useful in preparing 2-halo-3-(arylthio)-propionitriles in accordance with this invention include polycyclic arylthiols such as naphthalenethiol, naphthalene-2-thiol, 4-methylnaphthalenethiol, 5,8-dimethylnaphthalenethiol, 4-biphenylthiol, 2-biphenylthiol, 4'-methylbiphenylthiol, 4-cyclohexylthiophenol, etc.

For the preparation of the 2-halo-3-(arylthio)propionitriles by this reaction, the thiol is simply contacted with the α-haloacrylonitrile until formation of the halo(arylthio)propionitrile is complete. The reaction is preferably carried out in the presence of a basic catalyst, e.g., sodium metal, sodium methylate, sodium hydroxide, potassium hydroxide, potassium bicarbonate, quaternary ammonium hydroxides such as benzyltrimethylammonium hydroxide, etc. Solvents and/or diluents which may be employed include benzene, hexane, dioxane and other inert reaction media. The temperature of reaction varies with the reactivity of the reactants; generally, when heating is employed, the reaction mixture is conveniently brought to reflux temperature to assure completion of the reaction. Pressure variation generally offers no advantages and atmospheric pressure is conveniently employed. The product is isolated by conventional methods, e.g., extraction, distillation, etc.

The synthesis is illustrated by the following example:

*Example 8*

To a solution of 110 g. (1.0 mole) of benzenethiol (thiophenol) in 150 ml. of dioxane containing 5 ml. of 50% aqueous choline (2-hydroxyethyltrimethylammonium hydroxide) is added 79 g. (1.0 mole) of α-chloroacrylonitrile. There is an immediate exothermal reaction during the addition and the reaction mixture is held at 35–40° C. by cooling. After addition is complete, the reaction mixture is poured into ice water and the oil which separates is extracted with ether, dried, and the ether removed by evaporation. By distillation there is collected 2-chloro-3-(phenylthio)propionitrile as a yellow liquid, analyzing for $C_9H_8ClNS$ and having the α-chloro structure by infrared analysis.

In the alternative synthesis of this invention for 2-halo-3-(arylthio)propionitriles, an alkali metal salt of an aromatic thiol is reacted with a 2,3-dihalopropionitrile, whereby replacement of the β-halo substituent is obtained. The presently useful alkali metal salts of aromatic thiols are the sodium, potassium, rubidium, cesium, and lithium salts, sodium being preferred, of aromatic thiols as defined and listed immediately herein above; exemplary of such compounds are sodium thiophenate, sodium 4-methylthiophenate, sodium thionaphtholate, etc. The presently useful α,β-dihalopropionitriles are preferably halogenated propionitriles wherein both halogen substituents are the same, i.e., 2,3-dichloropropionitrile or 2,3-dibromopropionitrile, or wherein the more reactive halogen atom is on the beta carbon atom, as in 2-fluoro-3-bromopropionitrile.

The present reaction of a dihalopropionitrile with an alkali metal salt of an arenethiol may be employed to produce the same 2-halo-3-(arylthio)propionitriles as are obtained by the method employing a 2-haloacrylonitrile and an arenethiol outlined above. Exemplary of presently afforded 2-halo-3-(arylthio)propionitriles which can be obtained by either of these reactions are 2-chloro-3-(phenylthio)propionitrile, 2-chloro-3-(4-methylphenylthio)propionitrile, 2 - chloro - 3 - (biphenylthio)propionitrile, 2-chloro-3-(2,4-diethylphenylthio)propionitrile, etc.

The 2-halo-3-(arylthio)propionitriles are prepared from 2,3-dihalopropionitriles and the alkali metal salts of aromatic thiols by simply contacting the reactants until reaction is complete. The reaction takes place readily and cooling and/or diluents may be required to moderate the reaction rate initially. Heating up to the decomposition temperature of the reactants may be employed, if desired, to produce complete reaction. Suitable solvents and diluents for the reaction include water, ethylene glycol diethyl ether, ethylene glycol dimethyl ether, dioxane, etc. Sluggishly reacting pairs of reactants may advantageously be heated together in the absence of solvents. Catalysts are usually unnecessary; pressure variation generally offers no advantage and atmospheric pressure is ordinarily preferred. The products are isolated by extraction, distillation, etc.

*Example 9*

Sodium thiophenate is prepared by addition of 55 g. (0.5 mole) of thiophenol to an aqueous concentrated solution of sodium hydroxide. The aqueous solution of sodium thiophenate is gradually added with vigorous stirring to a mixture of 62 g. (0.5 mole) of 2,3-dichloropropionitrile and 300 ml. of water while the temperature of the reaction mixture is held at 35-40° C. by cooling. The reaction product is then extracted with ether and the ether solution dried, the ether removed by evaporation and the remaining product distilled. There is thus obtained 2-chloro-3-phenylthiopropionitrile as a liquid, b. 101–103° C./0.2 mm., having the analytical composition of $C_9H_8ClNS$ and exhibiting the characteristic infrared spectrum of an α-chloronitrile.

Both the 2-halo-3-arylthiopropionitriles prepared as described hereinabove and the 3-halo-2-arylthiopropionitriles of the present general formula

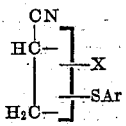

where X and Ar are as described hereinabove are believed to be present in the product of the addition of an aromatic sulfenyl halide to acrylonitrile. However, separation from the reaction mixtures is difficult, particularly in the case of the 3-halo-2-(arylthio)propionitriles, because of the ready dehydrohalogenation of these compounds.

For the synthesis of 3-halo-2-(arylthio)propionitriles by the presently proposed alternative method, there may be used a 2-(arylthio)acrylonitrile of the formula

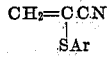

where Ar is an aromatic hydrocarbon radical free of aliphatic unsaturation, containing up to 12 carbon atoms, and linked to the S atom by a nuclear carbon atom. The 2-arylthioacrylonitriles are available by pyrolytic dehydrohalogenation of 2-halo-3-(arylthio)propionitriles. During the dehydrohalogenation, rearrangement of the nitrile occurs and there is obtained a 2-(arylthio)acrylonitrile. The 2-(arylthio)acrylonitriles are also available from the present reaction mixtures of acrylonitrile with aromatic sulfenyl halides, as noted hereinabove. By addition of a hydrogen halide to a 2-(arylthio)acrylonitrile, there is prepared a 3-halo-2-(arylthio) propionitrile.

The presently useful 2-(arylthio)acrylonitriles are exemplified, e.g., by the 2-(arylthio)acrylonitriles listed hereinabove as olefinic monomers which may be obtained by distillation or other treatment of the present acrylonitrile reaction products under conditions leading to dehydrohalogenation. Thus, for example, there may be employed 2-(phenylthio)acrylonitrile, 2-(4-methylphenylthio)acrylonitrile, 2-(2-methylphenylthio)acrylonitrile, 2-(2,4 - dimethylphenylthio)acrylonitrile, 2 - (2,4-diethylphenylthio)acrylonitrile, 2-(4-isopropylphenylthio)acrylonitrile, etc., or acrylonitriles substituted by arylthio radicals which are polycyclic such as 2-(naphthylthio)acrylonitrile, 2-(biphenylthio)-acrylonitrile, 2-(4-ethylbiphenylthio)acrylonitrile, etc.

Exemplary of presently afforded 3-halo-2-(arylthio) propionitriles which we contemplate as being particularly active microbiological toxicants are 3-chloro-2-(phenylthio)propionitrile, 3 - chloro - 2-(4-methylphenylthio) propionitrile, 3-chloro-2-(3,4-dimethylphenylthio)propionitrile, 3-chloro-2-(2,4-dimethylphenylthio)-propionitrile, 3-chloro-2 - [(mixed-tolyl)thio]propionitrile, 3-chloro-2-[(mixed-xylyl)thio]propionitrile, etc. For the preparation of the present 3-halo-2-(arylthio)propionitriles generally, other halogens, e.g., bromine, iodine, or fluorine, may be substituted for chlorine, but generally will be less preferable in the present application. Examples of other presently afforded halogenated compounds which are 3-halo-2-(arylthio)propionitriles are 3-chloro-2-(2,4,5-trimethylthio)propionitrile, 3 - bromo - 2-(4-methylphenylthio)propionitrile, 3-iodo-2-(4 - methylphenylthio)propionitrile, 3-fluoro-2 - (2,4-dimethylphenylthio)propionitrile, 3- chloro - 2 - (2,4-diethylphenylthio)propionitrile, 3-chloro-2-(4 - isopropylphenylthio)propionitrile, 3-chloro-2-(4 - t - butylphenylthio)propionitrile, 3 - chloro - 2-(4 - biphenylthio)propionitrile, 3-chloro-2-(naphthylthio) propionitrile, etc.

For the preparation of a 3-halo-2-(arylthio)propionitrile by the above-discussed synthesis, a hydrogen halide, preferably hydrogen chloride, is simply added to the chosen 2-(arylthio)-acrylonitrile. Advantageously, cooling is employed to moderate the rate of addition, and solvents or diluents such as benzene, ethylene dichloride or dioxane may be employed, if desired. The presence of catalysts is generally unnecessary. Sub- or superatmospheric pressures are operable, but generally atmospheric pressure is normally employed. The product is isolated by usual procedures, e.g., distillation, extraction, etc.

An illustrative operation is carried out as follows:

*Example 10*

Hydrogen chloride is slowly passed into a solution of 2-(phenylthio)acrylonitrile in benzene, held at 0° C. in a cooling bath, until the theoretical weight increase for formation of 3-chloro-2-(phenylthio)propionitrile is obtained. The product is washed with a dilute aqueous solution of sodium carbonate and then washed with water, after which the benzene is removed by distillation, leaving 3-chloro-2 - (phenylthio)propionitrile as an oil, b. 100–105° C./0.2 mm., exhibiting the marked nitrile absorption in the infrared spectrum characteristic of a non-α-chlorinated nitrile.

The reaction products and compounds of the invention prepared as outlined above are useful for a variety of agricultural and industrial purposes and are particularly adapted for the control of microorganisms.

Especially effective as bacteriostats and fungistats are the classes of products represented on the one hand by the reaction product of acrylonitrile with benzenesulfenyl chloride or mono- and dimethylbenzenesulfenyl chlorides, and on the other hand by the presently provided nitriles of the formula

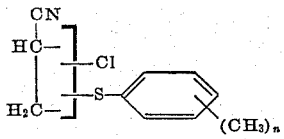

where $n$ represents an integer of from 0 to 2.

*Example 11*

For evaluation of bacteriostatic and fungistatic effect, the test chemicals were mixed in predetermined concentrations with hot sterile agar which was subsequently poured into Petri dishes, cooled, and allowed to harden. Nutrient agar containing the test compound was then inoculated with the bacteria *Micrococcus pyogenes* var. *aureus* and *Salmonella typhosa* and Sabouraud's dextrose agar containing the test compounds was inoculated with the fungus organism *Aspergillus niger*. The plates were incubated for 2 days at 37° C. The results are recorded in the following table wherein a plus (+) sign indicates growth of the microorganism and a minus (−) sign suppression of such growth; the concentrations of test chemicals in the agar are reported in parts per million. For comparison, test data for related compounds are included.

| Test Compound | M. pyogenes | | | S. typhosa | | | A. niger | | |
|---|---|---|---|---|---|---|---|---|---|
| | Concn. test compound, p.p.m. | | | | | | | | |
| | 100 | 10 | 1 | 100 | 10 | 1 | 100 | 10 | 1 |
| 1. R.p.[1] of acrylonitrile and benzenesulfenyl chloride | − | − | − | − | − | − | − | − | + |
| 2. R.p.[1] of acrylonitrile and toluenesulfenyl chloride | − | − | − | − | − | + | − | − | − |
| C$_6$H$_5$—CH$_2$CHCN—Cl | + | + | + | + | + | + | + | + | + |
| CH$_3$—C$_6$H$_4$—S—CH$_2$CH$_2$CN | + | + | + | + | + | | | | |

[1] Reaction product.

It will be seen that the reaction products of benzenesulfenyl chloride and of toluenesulfenyl chloride with acrylo-nitrile are potent bacteristats and fungistats. On the other hand, it is shown that β-(arylthio)propionitriles are not generally microbiological toxicants, nor are (aryl)(halo)propionitriles.

The present microbiological toxicant products are particularly useful for the prevention and control of bacterial infection and of decomposition and decay caused by mildew, molds, and other non-chlorophyll-containing plants. Thus, e.g., the present products may be used for the protection of organic materials subject to deterioration by rotting, such as leather, fur, pulp, paper, textiles, rope, rubber, latex, plastics and paint. Incorporation of protective fungistats in such organic materials is especially desirable when they are exposed to conditions favoring micrological growth. Thus, e.g., the present microbiological toxicants may be used to protect wood buried in ground, as in the case of railroad ties and telephone poles; textiles exposed to damp, as under tropical conditions, or in the case of lawn furniture, awnings, etc.; or they may be used in marine paints and lacquires subject to algal and fungal attack, etc. The present products may also be used as seed protectants and soil sterilants for the suppression of organisms harmful to seeds and plants. Additionally, the present microbiological toxicants, which are active against sulfate-reducing bacteria, may be added to oil field injection flood waters for the prevention of pipe plugging caused by hydrogen sulfide-releasing bacteria such as *Desulfavibrio desulfuricans*.

The microbiological toxicants of this invention also have a high degree of germicidal activity, and compositions containing these products are good disinfectants. Disinfectant compositions containing the present products may be used in the disinfection or sterilization of surgical instruments, dairy equipment, eating utensils, and other articles requiring such treatment, or in sanitary cleaning solutions to wash walls, floors, etc. When employed in the manufacture of pharmaceutical, cosmetical, edible compositions, the present microbiological toxicants may have both preservative and antiseptic effects.

The nitrile products of the invention may be applied directly to the material to be treated, e.g., by incorporation of the bacteriostatic and fungistatic nitrile in a disinfectant soap or antiseptic cream. However, because the present products are effective in extremely dilute concentrations, for most applications it is preferred to incorporate them in a carrier or diluent. The choice of diluent is determined by the use of the composition as is the concentration of the active ingredient in the diluent. Thus, by admixture with an inert pulverulent carrier such as talc, bentonite, kieselguhr, diatomaceous earth, etc., there may be prepared compositions suitable for admixture with seeds, etc., to afford protection from microbiological attack in the soil. Solutions of compounds in organic solvents such as kerosene may be applied as a spray or impregnating bath, if desired, with the use of pressure to facilitate penetration of the solution for treatment of cellulosic materials to produce, e.g., rot-proofing. Suitable formulations for application of the present nitrile products to articles subject to microbiological attack are also prepared by mixing the nitrile with an emulsifying agent suitably in the presence of organic solvents and then diluting with water to form an aqueous emulsion containing the nitrile. Suitable emulsifying agents include, e.g., alkylbenezenesulfonates, polyalkylene glycols, salts of sulfated long chain alcohols, sorbitan fatty acid esters, etc.; other emulsifying agents which may be used to formulate emulsions of the present compounds are listed, e.g., in U.S. Department of Agriculture Bulletin E607. Aqueous emulsions of the microbiological toxicant products of the invention are also particularly suited for use as disinfectant solutions, e.g., to wash floors and walls, or to rinse restaurant ware, etc. In another embodiment of this invention, standard paint formulations may be used as a diluent and carrier for the microbiological toxicant compounds of the invention; the nitrile product may assist in preventing mold growth in, e.g., casein paints and the paints may also be applied to surfaces which are thereby rendered resistant to the growth of lower organisms. The microbiological toxicants may also be admixed with carriers which are active of themselves, for example, with hormones with buffering and/or softening agents, etc.

Besides providing the novel method of inhibiting the growth of microorganisms which comprises the utilization of products of this invention, this invention concerns the provision of reaction products of olefinic nitriles and aromatic sulfenyl halides as defined hereinabove and of 3-halo-2-(arylthio)- and 2-halo-3-(arylthio)propionitriles of the formula shown hereinabove, as new and useful compounds and compositions. Illustrative of uses which are contemplated for the novel products of this invention is their use as a toxicant to organisms of higher order than the bacteria and fungi, i.e., nematodes, plants, etc.

Example 12

This reaction illustrates the use of one of the products of this invention as a herbicide.

An emulsion was prepared of the product of reaction of acrylonitrile with p-toluenesulfenyl chloride by dissolving the reaction product in acetone and adding thereto a small quantity of an emulsifying agent known as "Emulsifier L" and reputed to be a mixture of a polyalkylene glycol derivative and an alkylbenzenesulfonate. This emulsifiable concentrate was then diluted with water to form an 0.5% solution of the nitrile.

The emulsion prepared as described hereinabove was applied to 10-day to 2-week old specimens of grasses, e.g., wild oat, cheat grass, rye grass; broadleaf plants, e.g., radish, sugar beet, cotton and cucumber; and to two bean plants having one mature trifoliate and one partly opened trifoliate, at a rate equivalent to 9 lbs. of active chemical per acre. After two weeks, the plants were observed; it was found that both the grasses and the broadleaf plants sprayed with the nitrile solution were severely damaged, and the bean plants also exhibited moderate to severe injury.

Other of the presently provided products which may be used as herbicides include 3-chloro-2-(2,4-dimethylphenylthio)-propionitrile, the reaction product of acrylonitrile with xylenesulfenyl chloride, etc.

For application as herbicides, the present products may be formulated as solutions, aqueous emulsions, or dispersions or as dusts. To provide good adhesion to the plants sprayed, if desired, such compositions may include adhesives or sticking agents, etc. Effective herbicidal rates depend on the species to be controlled, the formulation employed, the active ingredient of the composition, etc., and may vary from 1 lb. or less to 50 or more lbs. per acre. Higher rates are suitable, e.g., for complete sterilization of ground, for example, on railway embankments, irrigation canal banks, etc., and lower concentrations to weed out land to be prepared for planting, and for similar purposes.

It is further contemplated that the presently provided sulfur-containing reaction products (e.g., adducts of $\alpha,\beta$-olefinic nitriles with aromatic sulfenyl halides) may be oxidized (e.g., with hydrogen peroxide in acetic acid, potassium permanganate, chromic acid, etc.) to provide the corresponding sulfoxide and sulfone derivatives. These oxidized reaction products will show biological toxicant properties comparable to that shown for the corresponding sulfides.

While the invention has been described with reference to particular preferred embodiments thereof, modifications and variations of the present invention will be obvious to those skilled in the art and are intended to be included in the scope of the present claims.

What is claimed is:

1. A biological toxicant composition comprising an aqueous emulsion and as the essential effective ingredient, a pesticidally effective amount of a compound of the formula

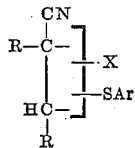

where R is selected from the class consisting of hydrogen and hydrocarbon radicals free of aliphatic unsaturation and containing from 1 to 6 carbon atoms, provided that at least one R represents hydrogen, X represents halogen, and Ar represents an aromatic hydrocarbon radical free of aliphatic unsaturation, attached to the sulfur atom by a nuclear carbon atom and containing up to 12 atoms.

2. A biological toxicant composition comprising an aqueous emulsion and as the essential effective ingredient, a pesticidally effective amount of compound of the formula

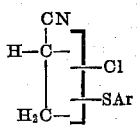

where Ar is a phenyl radical substituted by from 0 to 2 methyl radicals.

3. A biological toxicant composition comprising an aqueous emulsion and as the essential effective ingredient, a pesticidally effective amount of a compound of the formula

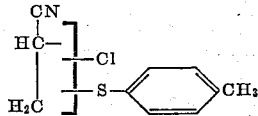

formula

4. The method of inhibiting the growth of undesired microorganisms which comprises exposing said microorganisms to a toxic amount of a compound of the formula

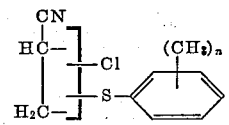

where $n$ is an integer from 0 to 2.

5. The method of inhibiting the growth of undesired microorganisms which comprises exposing said microorganisms to a toxic amount of a compound of the formula

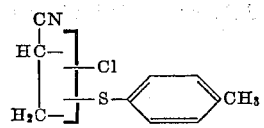

6. The method of inhibiting the growth of undesired microorganisms which comprises exposing said microorganisms to a toxic amount of a compound of the formula

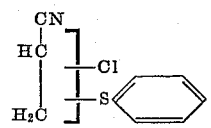

7. Arylthio-substituted haloalkanenitriles of the formula

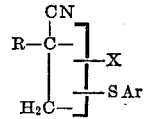

where R is selected from the class consisting of hydrogen and hydrocarbon radicals free of aliphatic unsaturation and containing from 1 to 6 carbon atoms, X represents halogen, and Ar represents an aromatic hydrocarbon radical free of aliphatic unsaturation, attached to the sulfur atom by a nuclear carbon atom and containing up to 12 carbon atoms.

8. The compounds of claim 7, where R represents hydrogen.

9. Arylthio-substituted haloalkane-nitriles of the formula

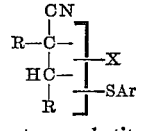

where each R represents a substituent selected from the class consisting of hydrogen and hydrocarbon radicals free of aliphatic unsaturation and containing from 1 to 6 carbon atoms, provided that at least one R represents hydrogen, X represents halogen, and Ar represents an aromatic hydrocarbon radical free of aliphatic unsaturation, attached to the sulfur atom by a nuclear carbon atom and containing up to 12 carbon atoms.

10. The haloalkane-nitriles of claim 8, wherein Ar is a monocyclic aromatic hydrocarbon radical and X is a chlorine atom.

11. The haloalkane-nitriles of claim 10, wherein Ar is a phenyl radical substituted by from 0 to 2 methyl radicals.

12. The haloalkane-nitriles of claim 11 wherein Ar is a phenyl radical.

13. The haloalkane-nitriles of claim 11, wherein Ar is a tolyl radical.

14. The method which comprises contacting an olefinic nitrile of the formula RCH=CRCN where each R represents a substituent selected from the class consisting of hydrogen and hydrocarbon radicals free of aliphatic unsaturation and containing from 1 to 6 carbon atoms, provided that at least one R represents hydrogen, with an aromatic sulfenyl halide of the formula ArSX where X represents halogen and Ar represents an aromatic hydrocarbon radical free of aliphatic unsaturation, attached to the sulfur atom by a nuclear carbon atom and containing up to 12 carbon atoms, thereby forming a product comprising arylthio-substituted haloalkanenitriles of the formula

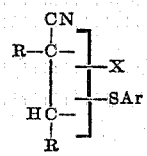

where X, R and Ar are as defined hereinabove.

15. The method of claim 14, wherein said olefinic nitrile is of the formula $CH_2$=CRCN where R represents a hydrocarbon radical free of aliphatic unsaturation and containing from 1 to 6 carbon atoms.

16. The method of claim 14, wherein said olefinic nitrile is acrylonitrile.

17. The method of claim 14, where said olefinic nitrile is acrylonitrile and said sulfenyl halide is a monocyclic aromatic sulfenyl chloride.

18. The method of claim 14, where said olefinic nitrile is acrylonitrile and said sulfenyl halide is a benzenesulfenyl chloride where the benzene ring of said sulfenyl chloride is substituted by from 0 to 2 methyl radicals.

19. The method of claim 14, where said olefinic nitrile is acrylonitrile and said sulfenyl halide is benzenesulfenyl chloride.

20. The method of claim 14, where said olefinic nitrile is acrylonitrile, and said sulfenyl halide is p-toluenesulfenyl chloride.

References Cited in the file of this patent

UNITED STATES PATENTS

| | | |
|---|---|---|
| 2,497,060 | Buc | Feb. 14, 1950 |
| 2,645,592 | Campbell | July 14, 1953 |
| 2,725,411 | Ladd et al. | Nov. 29, 1955 |
| 2,743,210 | Jones et al. | Apr. 24, 1956 |
| 2,788,360 | Westfahl | Apr. 9, 1957 |

OTHER REFERENCES

Brintzinger et al.: "Angew. Chemie," vol. 64, p. 398, 1952.